United States Patent
Kalenkov et al.

(10) Patent No.: US 9,959,475 B2
(45) Date of Patent: May 1, 2018

(54) TABLE DATA RECOVERING IN CASE OF IMAGE DISTORTION

(71) Applicant: ABBYY Development LLC, Moscow (RU)

(72) Inventors: Maksim Petrovich Kalenkov, Tatarstan (RU); Dmitrij Yurievich Chubanov, Moscow oblast (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 0 days. days.

(21) Appl. No.: 15/195,361

(22) Filed: Jun. 28, 2016

(65) Prior Publication Data

US 2017/0372156 A1    Dec. 28, 2017

(30) Foreign Application Priority Data

Jun. 27, 2016 (RU) .................. 2016125533

(51) Int. Cl.
| G06K 9/34 | (2006.01) |
| G06K 9/18 | (2006.01) |
| G06F 17/21 | (2006.01) |
| G06T 7/00 | (2017.01) |
| G06K 9/00 | (2006.01) |

(52) U.S. Cl.
CPC ............ *G06K 9/18* (2013.01); *G06F 17/212* (2013.01); *G06K 9/00449* (2013.01); *G06T 7/0085* (2013.01)

(58) Field of Classification Search
USPC ....... 382/176, 112, 266, 269, 169, 171, 276, 382/289, 274, 162, 165, 103, 305; 1/1; 358/326, 448, 3.27, 1.9; 715/227; 455/556.1
See application file for complete search history.

(56) References Cited

U.S. PATENT DOCUMENTS

| 8,214,733 B2 * | 7/2012 | Bastos dos Santos ............................ G06F 17/243 382/169 |
| 8,755,837 B2 * | 6/2014 | Rhoads ............ G06F 17/30244 382/162 |
| 9,208,536 B2 * | 12/2015 | Macciola .................. G06T 3/00 |
| 2005/0089248 A1 | 4/2005 | Zuev et al. |
| 2012/0256951 A1 | 10/2012 | Tsukagoshi |

FOREIGN PATENT DOCUMENTS

| RU | 2251738 C2 | 5/2005 |
| RU | 2012127786 A | 1/2014 |

* cited by examiner

*Primary Examiner* — Anh H Do
(74) *Attorney, Agent, or Firm* — Lowenstein Sandler LLP

(57) ABSTRACT

The subject matter of this specification can be implemented in, among other things, a method that includes identifying edges of a section of a document in a source image that includes at least one row of text. The method includes identifying characters in the document. The method includes identifying word portions. The method includes generating polynomials that approximate points of the characters within the word portions. The method includes generating a second polynomial that approximates the points of the characters of word portions. The method includes identifying a stretching coefficient of the row of text based on a length of the section between the edges relative to a length of the second polynomial. The method includes mapping portions of the source image along the row of text to new positions in a corrected image based on the second polynomial and the stretching coefficient.

20 Claims, 5 Drawing Sheets

TABLE DATA RECOVERING IN CASE OF IMAGE DISTORTION

CROSS REFERENCE TO RELATED APPLICATIONS

The present application claims the benefit of priority under 35 USC 119 to Russian Patent Application No. 2016125533, filed Jun. 27, 2016; disclosure of which is incorporated herein by reference in its entirety for all purposes.

TECHNICAL FIELD

This instant specification relates to removing warping from a scanned or photographed image of a document.

BACKGROUND

Optical character recognition (OCR) is the electronic conversion of scanned or photographed images of typewritten or printed text into computer-readable text. OCR can be used to digitize printed text so that the text can be electronically edited, searched, displayed on-line, and used in processes such as text-to-speech, data extraction, and text mining. Capturing an image of a document can result in a distorted perspective or other warping in the image of the document. Warping of the image of the document can lead to distortion or deformation of objects or text within the image of the document.

SUMMARY

In one aspect, a method includes identifying edges of at least a section of a document in a source image. The document includes at least one first row of text. The method further includes identifying a plurality of characters in the document. The method further includes identifying ones of the characters as a plurality of word portions. The method further includes generating a plurality of first polynomials that approximate points of the characters within the word portions. The method further includes generating a second polynomial that approximates the points of the characters of at least a first word portion and a second word portion among the word portions and corresponds to the first row of text. The method further includes identifying at least one stretching coefficient of the first row of text based on a maximum length of the section between the edges and a length of the second polynomial. The method further includes mapping, by at least one processing device, portions of the source image along the first row of text to new positions in a corrected image based on the second polynomial and the stretching coefficient.

Implementations can include any, all, or none of the following features. The points of the characters can be along a plurality of baselines of the word portions. The second polynomial can define one or more second angles representing slopes along the second polynomial. The method can further include stepping through existing positions in the source image by a step size that can be smaller than a pixel size of the source image. Mapping the portions can include mapping each of the existing positions to the new positions based on the second angles, the stretching coefficient, and the step size. The first polynomials can define a plurality of first angles representing slopes along the first polynomials. The second polynomial can define a plurality of second angles representing slopes along the second polynomial. The method can further include verifying that ones of the first angles for the first word portion and the second word portion are within a threshold level of accuracy from corresponding ones of the second angles. The method can include verifying that the first word portion and the second word portion are at least a threshold distance away from at least one second row of text in the document next to the first row of text. The threshold distance can be based on an average distance between polynomials corresponding to rows of text in the document. The method can include verifying that the second polynomial is within a threshold level of similarity to at least one third polynomial corresponding to at least one second row of text in the document. The method can include interpolating a color for each new position in the new positions of the corrected image based on colors from pixels of the source image in a vicinity of a portion among the portions of the source image that corresponds to the new position. The method can include pre-processing the source image. Pre-processing can include performing one or more of applying a gamma filter to the source image, normalizing a width and a height of the source image, adjusting a brightness of the source image, or binarizing a color depth of the source image. Identifying the edges can be based on a line detection algorithm or an edge detection algorithm. The new positions of the portions can remove distortion from the first row of text in the corrected image. The method can include generating at least one interpolated polynomial between the second polynomial and at least one third polynomial corresponding to at least one second row of text in the document. The method can further include mapping portions of the source image between the first row of text and the second row of text to new positions in the corrected image based on the interpolated polynomial.

In one aspect, a non-transitory computer-readable medium having instructions stored thereon that, when executed by at least one processing device, causes the processing device to identify edges of at least a section of a document in a source image. The document includes at least one first row of text. The instructions are further to cause the processing device to identify a plurality of characters in the document. The instructions are further to cause the processing device to identify ones of the characters as a plurality of word portions. The instructions are further to cause the processing device to generate a plurality of first polynomials that approximate points of the characters within the word portions. The instructions are further to cause the processing device to generate a second polynomial that approximates the points of the characters of at least a first word portion and a second word portion among the word portions and corresponds to the first row of text. The instructions are further to cause the processing device to identify at least one stretching coefficient of the first row of text based on a maximum length of the section between the edges and a length of the second polynomial. The instructions are further to cause the processing device to map portions of the source image along the first row of text to new positions in a corrected image based on the second polynomial and the stretching coefficient.

In one aspect, a system includes at least one memory that stores instructions. The system further includes at least one processing device to execute the instructions to identify edges of at least a section of a document in a source image. The document includes at least one first row of text. The processing device is further to identify a plurality of characters in the document. The processing device is further to identify ones of the characters as a plurality of word portions. The processing device is further to generate a plurality of first polynomials that approximate points of the characters within the word portions. The processing device is further to generate a second polynomial that approximates the points of the characters of at least a first word portion and a second word portion among the word portions and corresponds to the first row of text. The processing device is further to identify at least one stretching coefficient of the first row of text based on a maximum length of the section between the edges and a length of the second polynomial. The processing device is further to map portions of the source image along the first row of text to new positions in a corrected image based on the second polynomial and the stretching coefficient.

Implementations can include any, all, or none of the following features. The points of the characters can be along a plurality of baselines of the word portions. The second polynomial can define one or more second angles representing slopes along the second polynomial. The processing device can be further to step through existing positions in the source image by a step size that can be smaller than a pixel size of the source image. To map the portions, the processing device can be further to map each of the existing positions to the new positions based on the second angles, the stretching coefficient, and the step size. The first polynomials can define a plurality of first angles representing slopes along the first polynomials. The second polynomial can define a plurality of second angles representing slopes along the second polynomial. The processing device can be further to verify that ones of the first angles for the first word portion and the second word portion are within a threshold level of accuracy from corresponding ones of the second angles. The processing device can be further to verify that the first word portion and the second word portion are at least a threshold distance away from at least one second row of text in the document next to the first row of text. The threshold distance can be based on an average distance between polynomials corresponding to rows of text in the document. The processing device can be further to verify that the second polynomial is within a threshold level of similarity to at least one third polynomial corresponding to at least one second row of text in the document. The new positions of the portions can remove distortion from the first row of text in the corrected image. The processing device can be further to generate at least one interpolated polynomial between the second polynomial and at least one third polynomial corresponding to at least one second row of text in the document. The processing device can be further to map portions of the source image between the first row of text and the second row of text to new positions in the corrected image based on the interpolated polynomial.

DETAILED DESCRIPTION

Figure 1A:
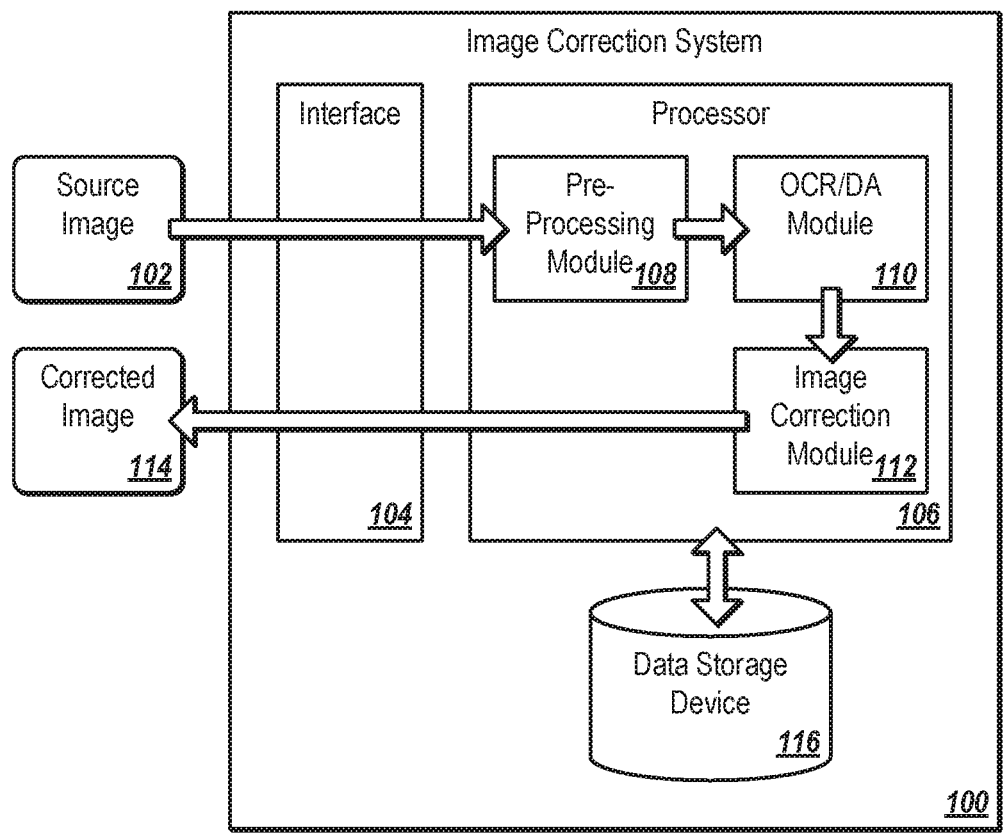
FIG. 1A is a block diagram that shows an example of an image correction system for removing distortion or warping from a source image.

This document describes systems and techniques for restoring an image of a document that is warped or distorted. A scanned or photographed image of a document with rows of text may include distortions or warping in the rows of text. For example, if the original physical copy of the document was crumpled, wrinkled, or otherwise distorted or warped, then the resulting scanned or photographed image of the document may also be distorted or warped and may include rows of text that are no longer in a straight line or words in the rows of text may appear to be slanted or at an incline, or characters may be shifted relative to one another. The distortion or warping may also be caused by the angle of a camera that captures the photographed image of the document relative to the position or orientation of the document (e.g., as in the case of a hand held camera that is tilted in one or more directions relative to the surface of the document). This can lead to errors or omissions in optical character recognition of the text in the document. In addition, for text that is recognized, the text may not be placed in a same row as other text after performing the optical character recognition even though the text may have been in the same row in the original physical copy of the document prior to the distortion of the original physical copy and the subsequent distortion in the scanned image.

Aspects of the present disclosure address the above and other deficiencies by remapping or dewarping the scanned or photographed image or portions of the scanned or photographed image to new positions in a corrected or restored image that removes distortion or warping from the document due to scanning or photographing of the crumples, wrinkles, or other distortions in the physical copy of the document. According to some implementations, optical character recognition may be used to recognize the characters within the image of the document. The recognized characters may be combined into words or word portions. According to some implementations, document analysis (DA) processing may be used to detect the connected components based on run-length encoding (RLE) and to combine the connected components into words or word portions. Namely the features of the document image may be analyzed to identify words or portions of words. In some implementations, optical character recognition (OCR) may be used for detection and recognition of characters and identifying words and word portions. A first set of polynomials can then be generated based on points along the characters of each word portion, such as along a baseline of the word portions. A second set of polynomials can be generated based on points along the characters of word portions to be glued together and representing a row of text. Word portions may be identified as being within the same row based on relative distances to one or more other rows of text. Stretching coefficients may be identified for each polynomial representing the row of text based on a length of the polynomial relative to a maximum length of the polynomials within the detected edges of the document. The second set of polynomials and the stretching coefficients can then be used to map portions of the original image to new positions in a corrected image.

The systems and techniques described here may provide one or more of the following advantages. First, the systems and techniques may remove distortion from the rows of text in the document. Second, the systems and techniques may make the rows of text in the document easier to read for a person or easier to recognize by optical character recognition.

FIG. 1 is a block diagram that shows an example of an image correction system 100 for removing distortion or warping from a source image 102. The image correction system 100 may receive the source image 102 through an interface 104. The interface 104 may be hardware, such as a network interface device, a communications port, or a removable storage media. The image correction system 100 includes a processor 106 or processing device that executes instructions to remove the distortion from the rows of text in the source image 102. The instructions may include a pre-processing module 108, an optical character recognition and/or document analysis module (OCR/DA module) 110, and an image correction module 112.

The processor 106 may execute the instructions of the pre-processing module 108 to perform pre-processing operations on the source image 102. For example, the pre-processing operations may include applying a gamma filter to the source image 102 to reduce noise in the source image 102. The source image 102 of the document may include noise that is from the original physical copy of the document or not from the original physical copy of the document, such as speckles or other artifacts of the scanning or capturing of the image of the document. This noise may be due to foreign objects (e.g., dust or dirt) being on the scanning surface or the original physical copy of the document. A gamma filter can be applied to pixels in the source image 102 to identify the noise as discontinuities between the pixels and neighboring pixels. When a discontinuity is identified that is not part of a larger feature in the source image 102, such as an edge between two differently colored regions, then a rule may be applied to the pixels in the discontinuity to replace the pixels with other color values, such as values of the neighboring pixels.

In addition, the pre-processing operations may include normalizing a width and a height of the source image 102. For example, normalization may include reducing or expanding the source image 102 to a particular number of pixels in width and a particular number of pixels in height (e.g., eight hundred pixels wide by six hundred pixels high for a small document, such as a receipt from a purchase, or a greater number of pixels in height for a larger document with more rows of text or a greater number of pixels in width for a wider rows of text). Reducing the source image 102 to a particular number of pixels based on the amount of text may reduce the amount of time needed to process the source image 102 without substantially decreasing the accuracy the optical character recognition and/or the removal of the distortion.

The pre-processing operations may further include adjusting a brightness of the source image 102, such as by adjusting shadows or highlights within the source image 102. Adjusting the shadows or highlights in the source image 102 within particular ranges of color or shading tones may improve detection of edges within the source image 102, such as edges of the document or the edges between characters and the background of the document. Adjusting the shadows or highlights in the source image 102 within particular ranges of color or shading tones may also improve non-detection of spurious features within the source image 102, such as the crumple or wrinkle lines from the physical copy of the document.

The pre-processing operations may also include binarizing a color depth of the source image 102 (e.g., to a monochrome, black and white, or greyscale color depth). The binarization may be adaptive such that separate brightness and saturation measurements of separate portions of the source image 102 are used when choosing the values for pixels within each separate portion. Binarization may aid in the optical character recognition of the text in the source image 102 by providing a significant contrast between the background of the source image 102 and the text of the source image 102.

The processor 106 may execute the instructions of the OCR/DA module 110 to identify and/or recognize characters within the source image 102, which may have been pre-processed as described herein. The execution of the instructions of the OCR/DA module 110 may also identify and/or recognize words or portions of words within the characters. The OCR/DA module 110 may detect connected components within the source image 102 using run-length encoding. For example, the OCR/DA module 110 may detect runs of a particular color of pixels (e.g., white) within the source image 102 to identify and/or recognize words or portions of words. The OCR/DA module 110 may classify ones of the recognized characters and/or word portions as confident, not confident, random characters, non-characters (e.g., points or dots), or special characters (e.g., hyphens, dashes, equal signs, asterisks, etc.).

In some implementations, the OCR/DA module 110 (or another module, such as the image correction module 112) may determine that a long row of text, which may include special characters and/or repeated characters, is a separator line between sections of the document. For example, a long row may be a row that goes substantially all the across the document, such as up to left and/or right margins of the document that generally do not include text.

The processor 106 executes the instructions of the image correction module 112 to remove distortion from the source image 102. The execution of the instructions of the image correction module 112 generates polynomials that approximate points of the characters within the word portions. The points may lie along a feature of the characters within the word portions, such as a baseline of the characters. The execution of the instructions of the image correction module 112 also identifies word portions as being within a same row of text and generates a polynomial that approximates the points of the characters of the word portions in the row of text. In addition, the execution of the instructions of the image correction module 112 identifies a stretching coefficient for the row of text based on the length of the row of text represented by the polynomial relative to an overall width of the document, such as a maximum length of polynomials in the document. Finally, the execution of the instructions of the image correction module 112 maps portions (e.g., individual pixels) of the source image 102 along the row of text to new positions in a corrected image 114 based on the generated polynomial and the stretching coefficient. Some aspects of the above operations of the image correction module 112 are described in more detail below in conjunction with FIGS. 2A-B and 3.

The processor 106 may store the source image 102 and/or the corrected image 114 in a data storage device 116. The processor 106 may also output the corrected image 114, for example, to another system or device through the interface 104 or another interface.

Figure 1B:
FIG. 1B shows an example of multiple characters and multiple features of the characters that may be used to generate polynomials.

FIG. 1B shows an example of multiple characters 120 and multiple features 122a-d of the characters 120 that may be used to generate polynomials. The image correction module 112 may use points along one or more of the features 122a-d of the characters 120 to generate the polynomials. The third feature 122c is the baseline of the characters 120. The baseline of characters in a word is a typographical term for the line upon which the characters typically sit for the particular font of the characters. However, some characters may have descenders that go below the baseline, such as in the case of the lower case letters "g," "j," "p," "q," and "y," and points where these characters cross the baseline, for example, may be used to generate the polynomials. Alternatively, the points used to generate the polynomials may be along another feature of the characters, such as a cap height, descender height, or median line of the characters. The first feature 122a is a cap height (e.g., the height of capital letters above the baseline before any overshoot). The fourth feature 122d is the descender height or the beard line (e.g., the height of the portion of a character that extends below the baseline). The second feature 122b is the median, mean line, or midline (e.g., half the distance from the baseline to the cap height or the height of short lower case letters above the baseline before any overshoot).

Figure 2A:
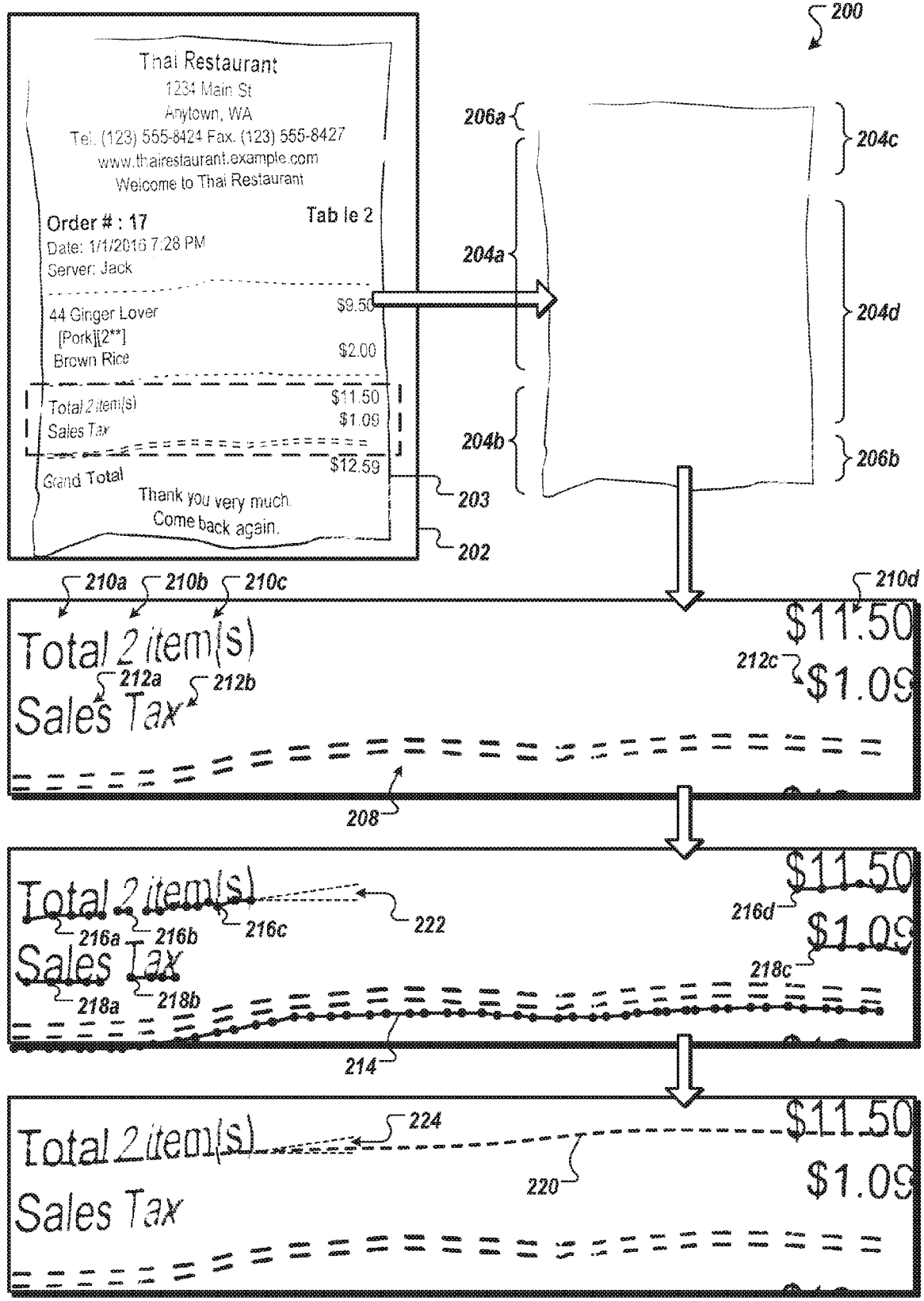
FIG. 2A is schematic diagrams that show an example of a system for removing distortion or warping from an image of a document.
Figure 2B:
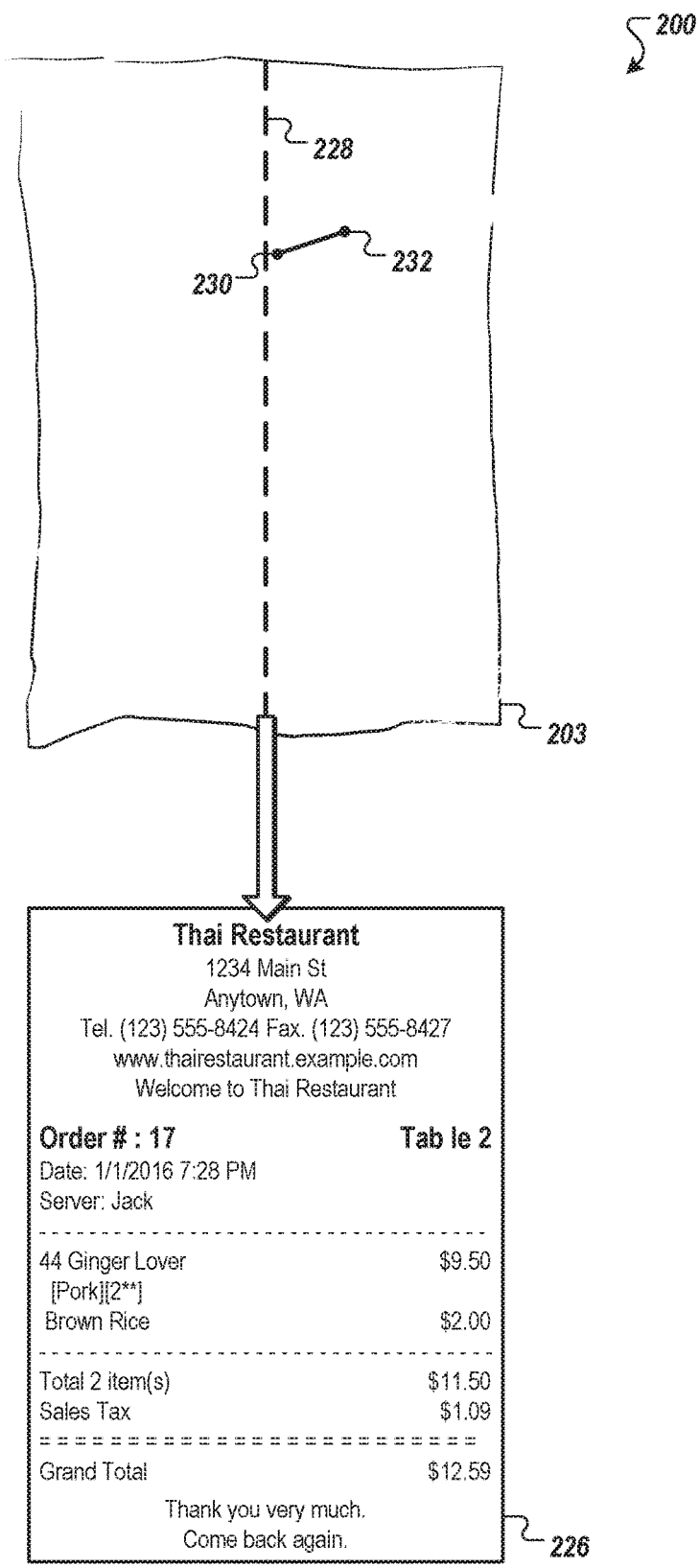
FIG. 2B is schematic diagrams that show an example of a system for removing distortion or warping from an image of a document.

FIGS. 2A-B are schematic diagrams that show an example of a process 200 for removing distortion or warping from a source image 202. In some implementations, the image correction system 100 may perform the process 200. In some implementations, the source image 202 may be an image of a document 203, such as a receipt or a check. The document 203 includes multiple rows of text. In some implementations, one or more of the rows of text may have large gaps between words, such as gaps between names of items purchased on a left side of the document 203 and purchase amounts in dollars and cents on a right side of the document 203. In some implementations, the combination of large gaps between words in a row and distortion of the document 203 in the source image 202, may prevent an OCR process from determining that the words are in the same row of text.

The process 200 includes identifying or detecting edges or borders of the document 203 in the source image 202. For example, the processor 106 may execute the instructions of the pre-processing module 108, the OCR/DA module 110, and/or the image correction module 112 to identify the edges of the document 203 in the source image 202. The edges may be depicted within the source image 202 as portions of a line around an outer edge of the document 203. Identifying the edges may include identifying the portions of the line around the outer edge of the document 203 in the source image 202. The confidence may be a measure of the level of certainty that the object detected is a line and that the object is the edge of the document 203 in the source image 202. For example, a faded, broken, wide, and/or slanted line and/or a line that does not match up with neighboring portions of the edges may have a low confidence level, while a dark, solid, narrow, and/or a vertical or horizontal line that matches up with neighboring portions of the edges may have a high level of confidence.

The process 200 may include identifying one or more first edge portions 204a-d of the document 203 in the source image 202 with a high level of confidence or that meet a predetermined threshold level of confidence. The first two of the first edge portions 204a-b are opposite the second two of the first edge portions 204c-d. The process 200 may also include identifying one or more second edge portions 206a-b of the document 203 in the source image 202 with a low level of confidence or that do not meet the threshold level of confidence. The low level of confidence or lack of meeting the threshold may be due to missing portions of the edge of the document 203 within the source image 202. In some implementations, the process 200 may include inferring the second edge portions 206a-b from the gaps in the first edge portions 204a-d. The process 200 may also include performing one or more of the previously described pre-processing operations within the document 203 inside the first edge portions 204a-d and/or the second edge portions 206a-b.

The process 200 includes recognizing characters within the source image 202 and identifying the word portions within the recognized characters, such as a first word portion 208, multiple second word portions 210a-d, and multiple third word portions 212a-c. The phrases "first word portion," "second word portion," and "third word portion" are used here for illustrative purposes and do not indicate that the word portions have been identified at this point as being within separate rows or groups. For example, the processor 106 may execute the instructions of the OCR/DA module 110 to recognize the characters and the word portions. The first word portion 208 includes a series of equal signs. The second word portions 210a-d include "Total," "2," "item(s)," and "$11.50." The third word portions 212a-c include "Sales," "Tax," and "$1.09." In some implementations, the process 200 may recognize less than all of a word, such as "Tot" within the second word portion 210a. In some implementations, the process 200 may recognize characters and/or a word portion, but a level of confidence in the recognition of the characters and/or word portion provided by the OCR of the source image 202 may not meet a threshold level of confidence. For example, due to distortion or noise in the document 203 in the source image 202, the process 200 may be unable to recognize the characters and/or the word portion with at least the threshold level of confidence.

Next, the process 200 includes generating a first polynomial 214 that approximates points of the characters within the first word portion 208, one or more second polynomials 216a-d that approximate points of the characters within the second word portions 210a-d, and one or more third polynomials 218a-c that approximate points of the characters within the third word portions 212a-c, respectively. The process 200 may include identifying the points along a feature of the characters within each word portion and then fitting a polynomial to the points for each word portion. For example, the processor 106 may execute the instructions of the image correction module 112 to identify the points along the characters and to generate the polynomials that approximate the points of the characters within the word portions. The points may be, for example, those points which lie along, intersect, or come in contact with a feature of the characters, such as a baseline of the characters.

In some implementations, the polynomial may have a degree of one (e.g., linear), two (e.g., quadratic), or a higher degree (e.g., cubic, etc.). For example, the image correction module 112 may determine that a word portion is short and then approximate the short word portion by fitting a linear function to the points of the short word portion without decreasing the ability to remove distortion from the short word portion. The image correction module 112 may determine that a word portion is long or that a set of multiple word portions is long and then approximate the long word portion or the set of multiple word portions by fitting a higher degree function, such as a quadratic or cubic function, to the long/multiple word portion in order to remove distortion from the long/multiple word portion. Fitting a lower degree polynomial to a word portion may provide a shorter amount of time spent processing the word portions than a higher degree polynomial.

The points of the characters used to generate the polynomials may be along baselines of the first word portion 208 and the second word portions 210*a-d*, such as where parts of the characters come in contact with the baseline or an equivalent for characters that do not come in contact with the baseline. Alternatively, the points used to generate the polynomials may be along another feature of the characters, such as a median line of the characters, a descender height of the characters, or a cap height of the characters.

The process 200 includes generating a glued polynomial 220 that approximates the points of the characters of multiple ones of the second word portions 210*a-d* and corresponds to a row of text in the document 203 within the source image 202, such as by fitting the glued polynomial 220 to the points of the characters of the multiple ones of the second word portions 210*a-d*. For example, the processor 106 may execute the instructions of the image correction module 112 to generate the glued polynomial 220 that approximates the points of the characters of multiple ones of the second word portions 210*a-d* and corresponds to a row of text in the document 203 within the source image 202.

The processor 106 may identify some polynomials, such as the first polynomial 214, as already being a complete row of text. For example, the processor 106 may determine that the characters of the first word portion 208 extend all the way or substantially all the way (e.g., within a predetermined threshold distance of the edges of the document 203) across the document 203 in the source image 202. A polynomial that is a complete row of text or extends across the document 203 may be referred to as an anchor or separator polynomial representing an anchor or separator line or row. In some implementations, separator rows include a special character (e.g., visible characters other than numbers or letters of an alphabet for a language of the document 203, such as an equal sign, a hyphen, a dash, an asterisk, etc.) and/or a repeated character, such as a repeated equal sign, a repeated hyphen, a repeated dash, or a repeated asterisk. The processor 106 may identify the first polynomial 214 as an anchor or separator by determining that the first word portion 208 includes a repeated and/or special character, such as the repeated equal sign. A separator line and corresponding separator polynomial may be used to glue neighboring polynomials for individual word portions together.

As part of generating the glued polynomial 220, the process 200 may include identifying the multiple ones of the second word portions 210*a-d* to be glued or merged together by calculating a probability that the multiple ones of the second word portions 210*a-d* are within the same row of text. For example, the processor 106 may execute the instructions of the image correction module 112 to identify the multiple ones of the second word portions 210*a-d* by calculating the probability that the multiple ones of the second word portions 210*a-d* are within the same row of text.

The process 200 may calculate the probabilities by calculating vertical distances between the first polynomial 214 and the third polynomials 218*a-c*, and between the third polynomials 218*a-c* and the second polynomials 216*a-d*. The process 200 includes determining if the vertical distance between two polynomials is less than an average vertical distance between polynomials in the source image 202. If so, then the process 200 includes determining that there are no further rows between the two polynomials. For example, the processor 106 may determine to glue or merge the left most two of the third polynomials 218*a-b* due to the close proximity of the left most two of the third polynomials 218*a-b* (e.g., the OCR/DA module 110 may determine that the two are part of one phrase). The OCR/DA module 110 may not be able to determine that the third polynomial 218*c* at the right is part of the same phrase as the left most two of the third polynomials 218*a-b* due to the horizontal distance between them and/or the distortion in the source image 202. The processor 106 may execute the instructions of the image correction module 112 to determine that the third polynomial 218*c* at the right, as well as the left most two of the third polynomials 218*a-b*, are a distance from the first polynomial 214 (e.g., the separator line) that is less than or within a predetermined threshold amount from the average distance between rows of polynomials. Accordingly, the processor 106 determines that no other rows can be between the third polynomials 218*a-c* and the first polynomial 214 and generates a glued polynomial for the third polynomials 218*a-c*.

Similarly, the processor 106 may determine that the distances between corresponding points along the third polynomials 218*a-c* and the second polynomials 216*a-d* are less than or within the threshold amount of the average distance. Accordingly, the processor 106 determines that no other rows can be between the third polynomials 218*a-c* and the second polynomials 216*a-d* and generates a glued polynomial for the second polynomials 216*a-d*. In some implementations, the processor 106 starts from a separator if one exists and then works away from the separator vertically through the polynomials (e.g., up and/or down from the separator until another separator becomes closer to a current polynomial).

The process 200 may also calculate the probabilities that multiple ones of the second word portions 210*a-d* are within the same row of text by calculating measures of first angles between one or more first slopes of each of the second polynomials 216*a-d* and a horizontal, and second angles between second slopes of the glued polynomial 220 that correspond to the locations of the first slopes and the horizontal. The process 200 may then include comparing the first angles to the second angles, respectively (or the first slopes to the second slopes), to determine how well the glued polynomial 220 matches the second polynomials 216*a-d*. For example, a first angle 222 includes a slope of the second polynomial 216*c* within the second word portion 210*c* and a second angle 224 includes the slope of the glued polynomial 220 at a point that corresponds to the first angle 222. The processor 106 may calculate a measure of the first angle 222 and the second angle 224 by finding a derivative of the polynomials at the corresponding points where the polynomials are being compared. The processor 106 may then determine if the difference between the first angle 222 and the second angle 224 is outside a threshold level of similarity (e.g., the difference is too high). If so, then the processor 106 does not include the points of the second polynomial 216*c* in the line fit for the glued polynomial 220.

The process 200 may further calculate the probabilities by verifying that neighboring glued polynomials (or polynomials for complete/separator rows) are within a threshold level of similarity to one another. If the polynomials are not within the threshold level of similarity, then the process 200 may include iteratively removing individual points for word portions from a glued polynomial until the threshold level of similarity is reached. In addition, the process 200 may calculate the probabilities by verifying that glued polynomials do not cross or intersect one another (e.g., by determining whether the polynomials have solutions or x-y coordinates in common with one another). If the polynomials cross or intersect, then the process 200 may include iteratively removing individual points for word portions from a glued polynomial until the glued polynomials no longer cross or intersect. The process 200 may further calculate the probabilities by verifying that each of the glued/complete polynomials is generated based on a predetermined threshold number of points within the word portions.

The process 200 may include using other criteria to determine when to glue word portions together and to approximate polynomials between the glued word portions. In one example of a criterion, the image correction module 112 may glue word portions together in response to determining that a minimum vertical distance between the polynomials of the word portions to be glued at horizontal positions across the polynomials is less than or equal to a particular threshold vertical distance, such as a particular number of pixels or zero. In some implementations, the image correction module 112 may normalize the vertical distance between the polynomials based on the heights of the word portions to be glued (e.g., by dividing the distance between the polynomials by a corresponding height of the word portions at the same horizontal position or an average height of the word portions).

In another example of a criterion, the image correction module 112 may glue word portions together in response to determining that a horizontal distance between a right most point of a first word portion and a left most point of a second word portion to the right of the first word portion in a row of text is less than or equal to a threshold horizontal distance, such as a particular number of pixels. In some implementations, the image correction module 112 may normalize the horizontal distance between the word portions based on the widths or lengths of the word portions (e.g., by dividing the horizontal distance between the word portions by the maximum width or length of the word portions).

In further examples of criteria, the image correction module 112 may glue word portions together in response to determining that the difference between the baseline angles of the word portions at points at the ends of the word portions are within a threshold amount of one another. The image correction module 112 may glue word portions together in response to determining that the difference between the angles of inclination of baselines of the glued word portions and baselines of complete polynomials having the same points are within a threshold amount of one another. The image correction module 112 may glue word portions together in response to determining that the heights of the glued word portions are within a threshold amount of one another (e.g., that the average heights of the word portions are approximately equal to one another). The image correction module 112 may glue a first word portion together with a second word portion that includes noise or unidentifiable characters in response to determining that the noise or unidentifiable characters are between the first word portion and a third word portion which do not include noise or unidentifiable characters. The image correction module 112 may glue word portions together in response to determining that a quality or confidence in the identification or recognition of the characters in the glued word portions meets a threshold level of quality or confidence. The image correction module 112 may approximate the polynomials so that angles of inclination of a first row of glued word portions are consistent with angles of inclination of adjacent rows of glued word portions.

After gluing polynomials, the source image 202 may have a series of glued and/or complete polynomials that approximate rows of text with the document 203, such as the glued polynomial 220 and the first polynomial 214, but some regions of the source image 202 may not have a corresponding glued/complete polynomial, such as regions where OCR/gluing was not confident (e.g., the third word portions 212a-c) and/or regions between the rows of text. The process 200 may include generating interpolated polynomials in the regions between the glued/complete polynomials, so that each pixel and/or region within the source image 202 has an associated polynomial. For example, the image correction module 112 may average the distance between each glued, complete, and/or interpolated polynomial at each horizontal position to identify a vertical coordinate. The image correction module 112 may then generate an interpolated polynomial through the averaged positions between the glued/complete/interpolated polynomials. The image correction module 112 may repeat this process until each pixel and/or region within the source image 202 has an associated polynomial.

The process 200 includes identifying stretching coefficients of each of the glued/complete polynomials. The stretching coefficient measures how much the source image 202 must be expanded across each of the polynomials to remove the distortion from the source image 202. For example, the processor 106 may execute the instructions of the image correction module 112 to calculate a maximum length of the polynomials within the detected edges of the document 203 in the source image 202, such as where the opposite ones of the first edge portions 204a-d are known with the high/threshold level of confidence. The length of each glued, complete, and/or interpolated polynomial may then be compared to the maximum length to identify the stretching coefficient for the glued/complete/interpolated polynomial. For example, the processor 106 may identify the stretching coefficient as the length of the glued/complete/interpolated polynomial relative to the maximum length (e.g., the maximum length divided by the length of the glued/complete/interpolated polynomial or vice versa).

In some implementations, the stretching coefficient may be constant along a corresponding one of the glued/complete/interpolated polynomials. For example, the image correction module 112 may evenly divide the difference between the length of the glued/complete/interpolated polynomial (or the width of the opposite ones of the first edge portions 204a-d at the glued/complete/interpolated polynomial) and the maximum width across the points of the glued/complete/interpolated polynomial. Alternatively, the stretching coefficient may not be constant along each glued/complete/interpolated polynomial. For example, the image correction module 112 may apply more of the difference to points near the ends of the glued/complete/interpolated polynomials where more distortion may occur.

The process 200 may include applying Gaussian smoothing to the glued, complete, and/or interpolated polynomials in the source image 202. For example, the image correction module 112 may apply Gaussian smoothing to the glued/complete/interpolated polynomials to smooth edges of the glued/complete/interpolated polynomials and/or to further remove noise from the source image 202.

As shown in FIG. 2B, the process 200 then includes mapping portions of the source image along the rows of text to new positions in a corrected image 226 based on slopes of the corresponding glued/complete/interpolated polynomials and corresponding stretching coefficients. The process 200 may include stepping through existing positions in the source image 202 by a step size that is smaller than a pixel size of the source image 202 (e.g., one half, one third, or one quarter of a pixel), and mapping each of the existing positions at each step to the new positions based on the glued/complete/interpolated polynomials, the stretching coefficients, and the step size. Alternatively, the step size may be a size of a pixel in the source image 202 or a multiple of the pixel size.

For example, the processor 106 may execute the instructions of the image correction module 112 to step through the source image 202 by the step size. The processor 106 may begin, for example, by finding a center line 228 of the source image 202. The processor 106 may then start at the top of the center line 228 and work outward to the left and the right, and then downward along the center line 228 and outward again, etc. In some implementations, the process 200 starts at the center line 228 due to the slopes of the polynomials being more likely to be close to zero near the center line 228. The step size for the left and right direction may be a different step size than the step size in the up and down direction.

At each point in the source image 202, the processor 106 maps the point from an existing position 230 to a new position 232. The processor 106 may represent the existing position 230 by a coordinate "x" along the horizontal axis and a coordinate "y" along the vertical axis. The processor 106 may represent the new position 232 along the horizontal axis as the coordinate "x" plus the stretching coefficient (k) for a glued/complete/interpolated polynomial that corresponds to the x/y coordinates multiplied by the step size (s) and the cosine of the slope (a) of a point along the glued/complete/interpolated polynomial that corresponds to the x/y coordinates (e.g., the new "x" coordinate=x+k*s*cos(a)). The processor 106 may represent the new position 232 along the vertical axis as the coordinate "y" plus the stretching coefficient (k) for the glued/complete/interpolated polynomial that corresponds to the x/y coordinates multiplied by the step size (s) and the sine of the slope (a) of a point along the glued/complete/interpolated polynomial that corresponds to the x/y coordinates (e.g., the new "y" coordinate=y+k*s*sin(a)).

In some implementations, the process 200 may include storing one or more mappings that map each pixel in the source image 202 to a particular slope at a point along a corresponding one of the glued/complete/interpolated polynomials and a stretching coefficient that corresponds to the glued/complete/interpolated polynomial or the point along the glued/complete/interpolated polynomial. For example, the image correction module 112 may store the mappings for each pixel in the data storage device 116 or another data storage device and/or memory. The image correction module 112 may then use the stored mappings to map the existing positions of the pixels in the source image 202 to the new positions. The image correction module 112 may then use the stored mappings to map the existing positions of the pixels in the source image 202 to the new positions. The image correction module 112 may also use the stored mappings to identify, from a new position in the corrected image 226, a previous existing position in the source image 202 from which the new position originated.

In addition, the process 200 may include interpolating a color for the new position 232 in the corrected image 226 based on interpolating of colors (e.g., color values) of pixels of the source image 202 in a vicinity of the new position 232. For example, the processor 106 may execute the instructions of the image correction module 112 to interpolate a color for the new position 232 as an average of the colors of pixels in the source image 202 that neighbor the new position 232, such as pixels that are immediate neighbors of the pixel (e.g., that touch or are diagonal from the pixel) or pixels that are one or two pixels away from the pixel. The image correction module 112 may store the interpolated color in the corrected image 226 and/or the data storage device 116.

Figure 3:
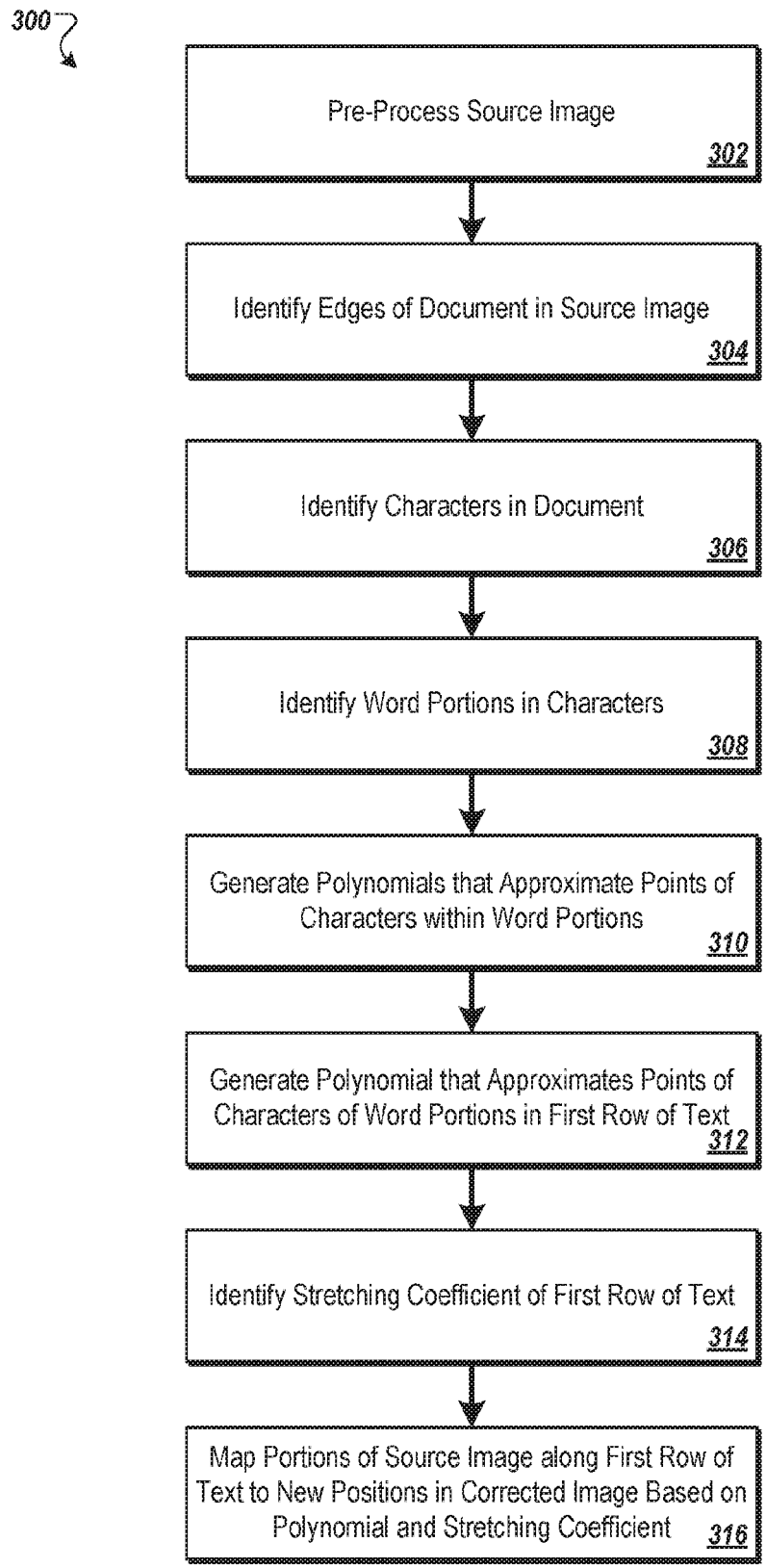
FIG. 3 is flow chart that shows an example of a process for removing distortion or warping from an image of a document.

FIG. 3 is a flow chart that shows an example of a process 300 for removing distortion or warping from an image of a document, in accordance with some aspects of the same disclosure. The process 300 may be performed, for example, by a system such as the image correction system 100 or the process 200. For clarity of presentation, the description that follows uses the image correction system 100 and the process 200 as examples for describing the process 300. However, another system, or combination of systems, may be used to perform the process 300.

The process 300 may begin, at step 302, with pre-processing a source image. In some implementations, pre-processing may include performing one or more of applying a gamma filter to the source image, normalizing a width and a height of the source image, adjusting a brightness of the source image, or binarizing a color depth of the source image. For example, the pre-processing module 108 may pre-process the source image 202.

At step 304, the process 300 includes identifying edges of at least a section of a document in the source image. The document includes at least one first row of text. In some implementations, identifying the edges may be based on a line detection algorithm or an edge detection algorithm. For example, the pre-processing module 108, the OCR/DA module 110, and/or the image correction module 112 may identify the first edge portions 204a-d and the second edge portions 206a-b of the document 203 in the source image 202.

At step 306, the process 300 includes identifying characters in the document. At step 308, the process 300 includes identifying ones of the characters as word portions. For example, the OCR/DA module 110 may identify the first word portion 208, the second word portions 210a-d, and the third word portions 212a-c, as well as the characters within the word portions, using optical character recognition. In addition, the OCR/DA module 110 may identify connected components within the source image 202 that may be combined into words or the first word portion 208, the second word portions 210a-d, and the third word portions 212a-c. In some implementations, the OCR/DA module 110 may identify characters without using OCR. The OCR/DA module 110 may analyze the source image 202 of the document 203 and the features of the source image 202.

At step 310, the process 300 includes generating first polynomials that approximate points of the characters within the word portions. In some implementations, the points of the characters may be along baselines of the word portions. For example, the image correction module 112 may generate the first polynomial 214, the second polynomials 216a-d, and the third polynomials 218a-c that approximate the points along the baselines of the first word portion 208, the second word portions 210a-d, and the third word portions 212a-c, respectively.

At step 312, the process 300 includes generating a second polynomial that approximates the points of the characters of at least a first word portion and at least a second word portion among the word portions and corresponds to the first row of text. In some implementations, a first confidence in the identification of the characters of a first word portion among the word portions meets a threshold level of confidence and a second confidence in the identification of the characters of a second word portion among the word portions does not meet the threshold level of confidence. In some implementations, the first confidence may be based on optical character recognition of the characters of the first word portion and the second confidence may be based on optical character recognition of the characters of the second word portion. For example, the image correction module 112 may generate the glued polynomial 220 for the points along the second polynomials 216a-d and the second word portions 210a-d.

In some implementations, the first polynomials define a plurality of first angles representing slopes along the first polynomials and the second polynomial defines a plurality of second angles representing slopes along the second polynomial. The process 300 may further include verifying that ones of the first angles for the first word portion and the second word portion are within a threshold level of accuracy from corresponding ones of the second angles.

In some implementations, the process 300 may further include verifying that the first word portion and the second word portion are at least a threshold distance away from at least one second row of text in the document next to the first row of text. The threshold distance may be based on an average distance between polynomials corresponding to rows of text in the document. In some implementations, the process 300 may further include verifying that the second polynomial is within a threshold level of similarity to at least one third polynomial corresponding to at least one second row of text in the document. For example, the process 300 may include verifying that slopes along the second polynomial are within a threshold amount of corresponding slopes along at least one third polynomial corresponding to at least one second row of text in the document.

At step 314, the process 300 includes identifying at least one stretching coefficient of the first row of text based on a maximum length of the section between the edges and a length of the second polynomial. For example, the image correction module 112 may identify the stretching coefficient of the glued polynomial 220.

At step 316, the process 300 includes mapping, by at least one processing device, portions of the source image along the first row of text to new positions in a corrected image based on the second polynomial and the stretching coefficient. In some implementations, mapping the portions of the source image to the new positions in the corrected image removes distortion from the first row of text in the corrected image. In some implementations, the second polynomial defines one or more second angles representing slopes along the second polynomial. The process 300 may further include stepping through existing positions in the source image by a step size that is smaller than a pixel size of the source image and mapping the portions may include mapping each of the existing positions to the new positions based on the second angles, the stretching coefficient, and the step size. For example, the image correction module 112 may step through the source image 202 and use the glued/complete polynomials and the stretching coefficients to map the portions of the source image 202 to the corrected image 226 (e.g., to map the existing position 230 in the source image 202 to the new position 232 in the corrected image 226). In some implementations, the process 300 may further include interpolating a color for each new position in the new positions of the corrected image based on colors from pixels of the source image in a vicinity of a portion among the portions of the source image that corresponds to the new position.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 4:
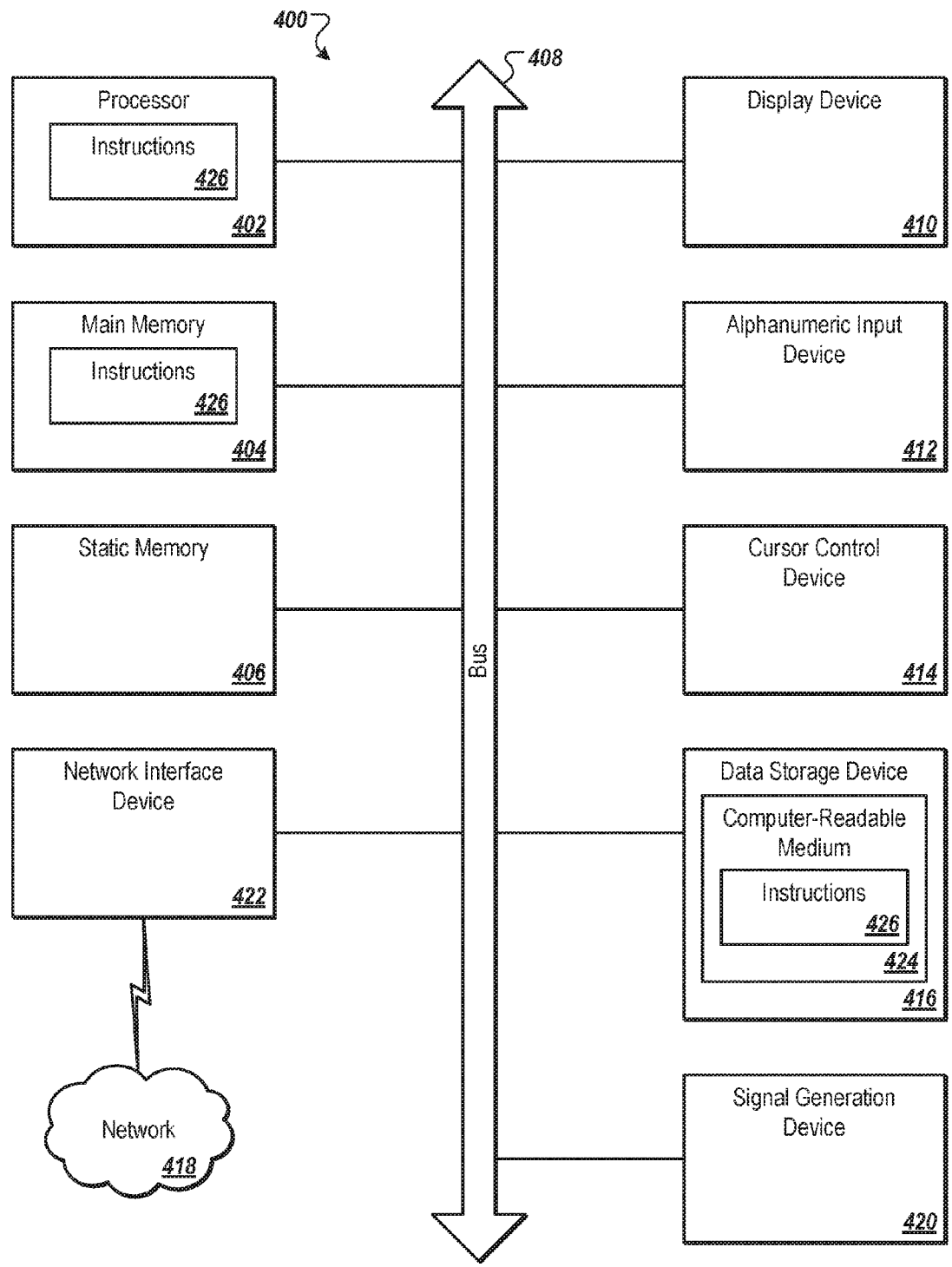
FIG. 4 is a schematic diagram that shows an example of a computing system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the pre-processing module 108, the OCR/DA module 110, and/or the image correction module 112 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the pre-processing module 108, the OCR/DA module 110, and/or the image correction module 112 embodying any one or more of the methodologies or functions described herein. The sets of instructions 426 of the pre-processing module 108, the OCR/DA module 110, and/or the image correction module 112 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying," "providing," "enabling," "finding," "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    identifying edges of at least a section of a document in a source image, wherein the document comprises at least one first row of text;
    identifying a plurality of characters in the document;
    identifying ones of the characters as a plurality of word portions;
    generating a plurality of first polynomials that approximate points of the characters within the word portions;
    generating a second polynomial that approximates the points of the characters of at least a first word portion and a second word portion among the word portions and corresponds to the first row of text;
    identifying at least one stretching coefficient of the first row of text based on a maximum length of the section between the edges and a length of the second polynomial; and
    mapping, by at least one processing device, portions of the source image along the first row of text to new positions in a corrected image based on the second polynomial and the stretching coefficient.

2. The method of claim 1, wherein the points of the characters are along a plurality of baselines of the word portions.

3. The method of claim 1, wherein the second polynomial defines one or more second angles representing slopes along the second polynomial, wherein the method further comprises stepping through existing positions in the source image by a step size that is smaller than a pixel size of the source image, and wherein mapping the portions comprises mapping each of the existing positions to the new positions based on the second angles, the stretching coefficient, and the step size.

4. The method of claim 1, wherein the first polynomials define a plurality of first angles representing slopes along the first polynomials, wherein the second polynomial defines a plurality of second angles representing slopes along the second polynomial, and wherein the method further comprises verifying that ones of the first angles for the first word portion and the second word portion are within a threshold level of accuracy from corresponding ones of the second angles.

5. The method of claim 1, further comprising verifying that the first word portion and the second word portion are at least a threshold distance away from at least one second row of text in the document next to the first row of text, wherein the threshold distance is based on an average distance between polynomials corresponding to rows of text in the document.

6. The method of claim 1, further comprising verifying that the second polynomial is within a threshold level of similarity to at least one third polynomial corresponding to at least one second row of text in the document.

7. The method of claim 1, further comprising interpolating a color for each new position in the new positions of the corrected image based on colors from pixels of the source image in a vicinity of a portion among the portions of the source image that corresponds to the new position.

8. The method of claim 1, further comprising pre-processing the source image, wherein pre-processing comprises performing one or more of applying a gamma filter to the source image, normalizing a width and a height of the source image, adjusting a brightness of the source image, or binarizing a color depth of the source image.

9. The method of claim 1, wherein identifying the edges is based on a line detection algorithm or an edge detection algorithm.

10. The method of claim 1, wherein the new positions of the portions remove distortion from the first row of text in the corrected image.

11. The method of claim 1, further comprising:
generating at least one interpolated polynomial between the second polynomial and at least one third polynomial corresponding to at least one second row of text in the document; and
mapping portions of the source image between the first row of text and the second row of text to new positions in the corrected image based on the interpolated polynomial.

12. A non-transitory computer-readable medium having instructions stored thereon that, when executed by at least one processing device, cause the processing device to:
identify edges of at least a section of a document in a source image, wherein the document comprises at least one first row of text;
identify a plurality of characters in the document;
identify ones of the characters as a plurality of word portions;
generate a plurality of first polynomials that approximate points of the characters within the word portions;
generate a second polynomial that approximates the points of the characters of at least a first word portion and a second word portion among the word portions and corresponds to the first row of text;
identify at least one stretching coefficient of the first row of text based on a maximum length of the section between the edges and a length of the second polynomial; and
map, by the processing device, portions of the source image along the first row of text to new positions in a corrected image based on the second polynomial and the stretching coefficient.

13. A system comprising:
at least one memory that stores instructions; and
at least one processing device to execute the instructions to:
identify edges of at least a section of a document in a source image, wherein the document comprises at least one first row of text;
identify a plurality of characters in the document;
identify ones of the characters as a plurality of word portions;
generate a plurality of first polynomials that approximate points of the characters within the word portions;
generate a second polynomial that approximates the points of the characters of at least a first word portion and a second word portion among the word portions and corresponds to the first row of text;
identify at least one stretching coefficient of the first row of text based on a maximum length of the section between the edges and a length of the second polynomial; and
map portions of the source image along the first row of text to new positions in a corrected image based on the second polynomial and the stretching coefficient.

14. The system of claim 13, wherein the points of the characters are along a plurality of baselines of the word portions.

15. The system of claim 13, wherein the second polynomial defines one or more second angles representing slopes along the second polynomial, wherein the processing device is further to step through existing positions in the source image by a step size that is smaller than a pixel size of the source image, and wherein, to map the portions, the processing device is further to map each of the existing positions to the new positions based on the second angles, the stretching coefficient, and the step size.

16. The system of claim 13, wherein the first polynomials define a plurality of first angles representing slopes along the first polynomials, wherein the second polynomial defines a plurality of second angles representing slopes along the second polynomial, and wherein the processing device is further to verify that ones of the first angles for the first word portion and the second word portion are within a threshold level of accuracy from corresponding ones of the second angles.

17. The system of claim 13, wherein the processing device is further to verify that the first word portion and the second word portion are at least a threshold distance away from at least one second row of text in the document next to the first row of text, and wherein the threshold distance is based on an average distance between polynomials corresponding to rows of text in the document.

18. The system of claim 13, wherein the processing device is further to verify that the second polynomial is within a threshold level of similarity to at least one third polynomial corresponding to at least one second row of text in the document.

19. The system of claim 13, wherein the new positions of the portions remove distortion from the first row of text in the corrected image.

20. The system of claim 13, wherein the processing device is further to:
   generate at least one interpolated polynomial between the second polynomial and at least one third polynomial corresponding to at least one second row of text in the document; and
   map portions of the source image between the first row of text and the second row of text to new positions in the corrected image based on the interpolated polynomial.

\* \* \* \* \*